United States Patent
Bruzzone et al.

(10) Patent No.: US 12,290,891 B2
(45) Date of Patent: May 6, 2025

(54) DEVICE AND METHOD FOR POSITIONING A MODULE OF MODULAR BED FOR MACHINE TOOLS

(71) Applicant: Profacere SRL, Genoa (IT)

(72) Inventors: Alessandro Arturo Bruzzone, Genoa (IT); Margherita Monti, Genoa (IT); Ivan Rosciano, Toirano (IT)

(73) Assignee: PROFACERE SRL, Genoa (IT)

( * ) Notice: Subject to any disclaimer, the term of this patent is extended or adjusted under 35 U.S.C. 154(b) by 592 days.

(21) Appl. No.: 17/628,284

(22) PCT Filed: Jul. 21, 2020

(86) PCT No.: PCT/EP2020/070560
§ 371 (c)(1),
(2) Date: Jan. 19, 2022

(87) PCT Pub. No.: WO2021/013837
PCT Pub. Date: Jan. 28, 2021

(65) Prior Publication Data
US 2022/0281045 A1    Sep. 8, 2022

(30) Foreign Application Priority Data
Jul. 22, 2019 (IT) .......... 102019000012486

(51) Int. Cl.
*G01C 9/22* (2006.01)
*B23Q 1/01* (2006.01)
*B23Q 1/25* (2006.01)

(52) U.S. Cl.
CPC .......... *B23Q 1/015* (2013.01); *B23Q 1/25* (2013.01)

(58) Field of Classification Search
CPC .......... G01C 9/18; G01C 9/20; G01C 9/22
USPC .......... 33/367, 377
See application file for complete search history.

(56) References Cited

U.S. PATENT DOCUMENTS

| | | | | | |
|---|---|---|---|---|---|
| 2,113,893 | A | * | 4/1938 | Loosli | G01C 5/04 33/291 |
| 2,755,560 | A | * | 7/1956 | Spaeder | G01C 9/22 33/367 |
| 2,814,127 | A | * | 11/1957 | Blatchford | G01C 5/04 33/367 |

(Continued)

FOREIGN PATENT DOCUMENTS

| | | |
|---|---|---|
| EP | 2913729 A1 | 9/2015 |
| GB | 2153736 A | 8/1985 |
| WO | 2019106104 A1 | 6/2019 |

OTHER PUBLICATIONS

PCT Written Opinion of the International Searching Authority, PCT/EP2020/070560, Posted to Patentscope Jan. 28, 2021.

(Continued)

*Primary Examiner* — George B Bennett
(74) *Attorney, Agent, or Firm* — Flener IP & Business Law; Zareefa B. Flener

(57) ABSTRACT

A device for positioning a module of modular bed (4) for machine tools with respect to a reference module (41), comprising a liquid-based leveling device (2) which allows an alignment of the modules (41, 42) according to three degrees of freedom (Z,a,b) and a base support (3) which allows a spatial movement of the module to be installed (42) at least according to the three degrees of freedom (Z,a,b).

7 Claims, 8 Drawing Sheets

(56) References Cited

U.S. PATENT DOCUMENTS

| | | | | |
|---|---|---|---|---|
| 3,540,548 | A * | 11/1970 | Halsey | E04F 21/1838 |
| | | | | 33/367 |
| 4,794,704 | A * | 1/1989 | Calcagni | G01C 5/04 |
| | | | | 33/367 |
| 4,991,302 | A * | 2/1991 | Brewer | G01C 5/04 |
| | | | | 33/367 |
| 5,074,049 | A * | 12/1991 | Hung | G01C 5/04 |
| | | | | 33/367 |
| 6,625,896 | B1 * | 9/2003 | Olson | G01C 9/20 |
| | | | | 33/366.11 |
| 6,655,036 | B2 * | 12/2003 | Cheng-I | G01C 5/04 |
| | | | | 33/367 |
| 9,273,988 | B2 * | 3/2016 | Olshefsky | G01F 23/00 |
| 9,995,579 | B2 * | 6/2018 | Boudin | G01C 5/04 |
| 10,322,779 | B2 * | 6/2019 | Mitsuru | B63B 39/14 |
| 10,495,532 | B2 * | 12/2019 | Lee | G01C 9/22 |
| 2017/0232567 | A1 | 8/2017 | Suzuyama et al. | |

OTHER PUBLICATIONS

International Search Report, PCT/EP2020/070560, Date of mailing of international search Nov. 6, 2020.

* cited by examiner

DEVICE AND METHOD FOR POSITIONING A MODULE OF MODULAR BED FOR MACHINE TOOLS

The present invention relates to a device and a method for positioning a module of modular bed for machine tools, and to an associated bed.

As is known, machine tools (e.g., milling machines, lathes and the like) are usually constituted by a bed which in turn rests on the floor or foundation; in some cases the bed is integrated with the machine itself and there is only one for the entire machine: in this case the installation of the machine at its work site does not entail particular difficulties, since it is sufficient to position the bed correctly according to the prescriptions of the machine tool maker.

In other cases, however, the bed of the machine is composed of multiple parts, or modules, which are mutually connected so as to form the actual bed.

In these cases, in addition to the spatial orientation with which the bed itself must comply (e.g., horizontality), the individual modules that constitute the bed must be mutually positioned spatially (or oriented) correctly in order to allow a geometrically correct connection, while avoiding delicate and complex adjustment maneuvers, also in view of the fact that the floor or foundation on which the module is to be positioned is often uneven, that the bed and the individual bed modules of a machine tool are particularly heavy, and that in order to ensure the required geometric tolerances it is necessary to give the assembly maximum stability and rigidity, which are fundamental for the functionality of the machine tool and for the precision of the work.

An even more complex case (in the context of which the problems are even more strongly felt) is that of a bed provided as described in WO2019106104: in this case, the correct orientation of the modules that constitute the bed is rendered even more difficult due to the fact that not only do the individual modules have connections for the working fluids of the machine (e.g., refrigerating fluid, lubricant etc.), but they also need to couple the linear guides that allow the linear movement of carriages, worktables and/or machining tables of the machine along the direction of the guide through the finished bed.

In this case, an incorrect positioning of the modules completely prevents the connections of the fluid couplings or of the linear guides, ultimately making it impossible to use the machine.

Consider for example the case in which it is necessary to add a module to a bed that is already positioned: when the new module is to be placed, it must be positioned spatially according to six degrees of freedom (three perpendicular axes and three angular rotations about said axes): the task is therefore particularly complex and delicate, with the consequence that in order to obtain a correct positioning (which ensures the functional operation of the machine) it is often necessary to perform multiple corrections of the positioning, and this entails a long assembly time.

The aim of the present invention is to provide a device for positioning a module of modular bed for machine tools and an associated method of positioning, as well as a modular bed, which is capable of improving the background art in one or more of the aspects indicated above.

Within this aim, an object of the invention is to provide a device for positioning a module of modular bed for machine tools and an associated method of positioning, as well as a modular bed for positioning and joining, which is useful to allow an orientation of the modules that compose the bed in a relatively rapid manner.

Another object of the invention is to provide a device for positioning a module of modular bed for machine tools and an associated method of positioning, as well as a modular bed for positioning and joining, which is useful to allow an orientation of the modules that compose the bed in a relatively precise manner.

Another object of the present invention is to overcome the drawbacks of the background art in an alternative manner to any existing solutions.

Another object of the invention is to provide a device for positioning a module of modular bed for machine tools and an associated method of positioning, as well as a modular bed for positioning and joining, which is highly reliable, relatively easy to provide and low cost.

This aim, as well as these and other objects which will become better apparent hereinafter, are achieved by the device for positioning a module of modular bed for machine tools and an associated method of positioning, as well as a modular bed for positioning and joining, according to the respective independent claims, optionally provided with one or more of the characteristics of the dependent claims.

Further characteristics and advantages of the invention will become better apparent from the description of a preferred but not exclusive embodiment of the device for positioning a module of modular bed for machine tools and of the associated method of positioning, as well as a modular bed for positioning and joining, according to the invention, illustrated by way of non-limiting example in the accompanying drawings, wherein.

Figure 1:
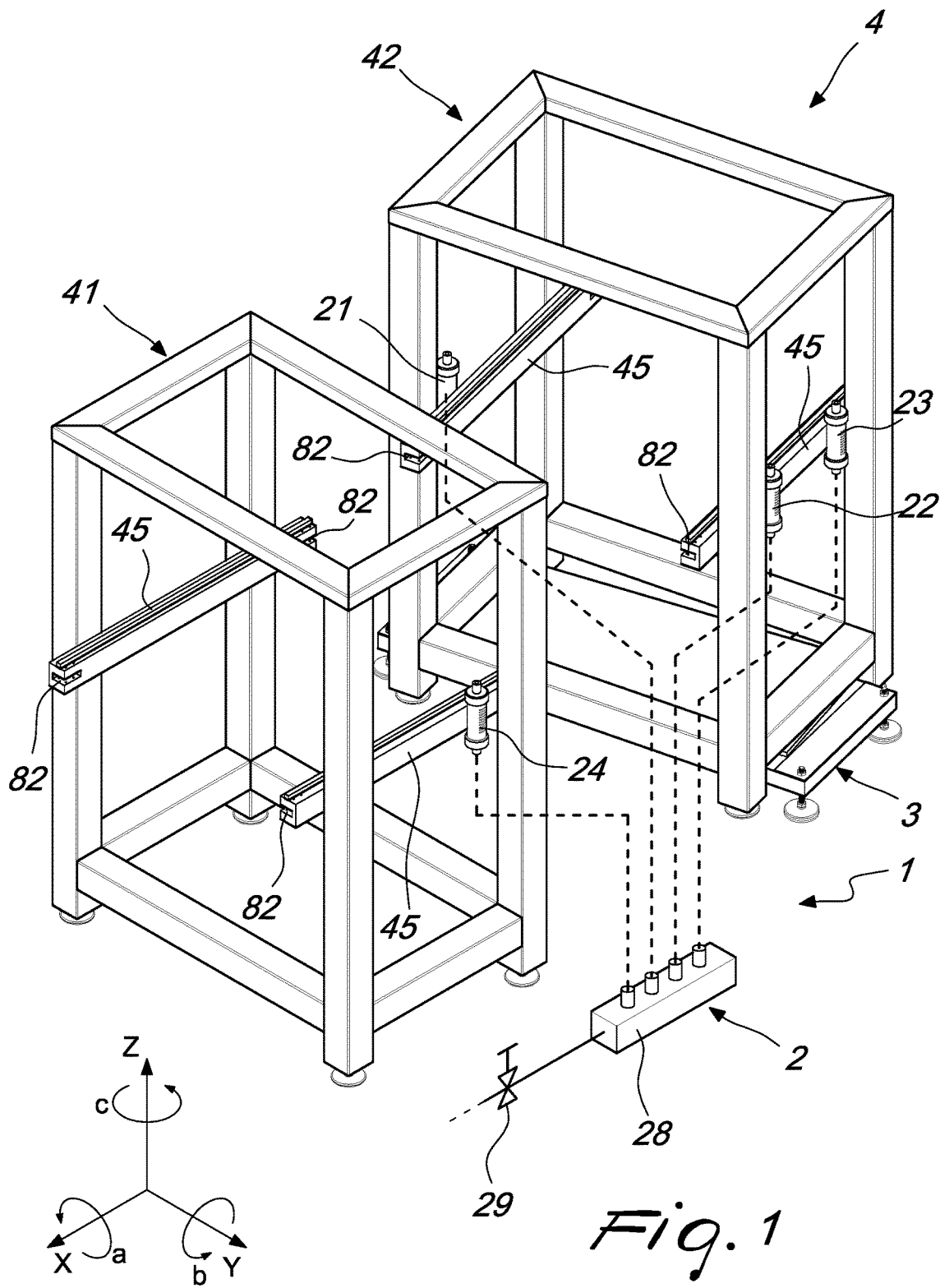
FIG. 1 is a perspective view of a modular bed during assembly, in which a new module is to be assembled to a reference module that is already mounted, with an assembly and orientation device according to the invention in a first embodiment.

With reference to the figures, hereinafter the device for positioning a modular bed module for machine tools is described first and then the associated method of positioning is described, both being the subject matter of the invention.

The device for positioning a module of modular bed for machine tools according to the invention, designated generally by the reference numeral 1, is substantially in the form of a positioning kit, comprising two assemblies which are physically mutually distinct but which functionally cooperate with each other in order to allow a correct positioning of a module to be installed 42 with respect to a reference module (for example an already installed module) 41; in particular, the bed 4 is provided by joining the modules 41 and 42 and any other additional modules, which are not described here since they are similar.

The bed 4 for a machine tool, once assembled, is provided with longitudinal members equipped with integrated guides 45 which have a horizontal spatial orientation.

Figure 2:
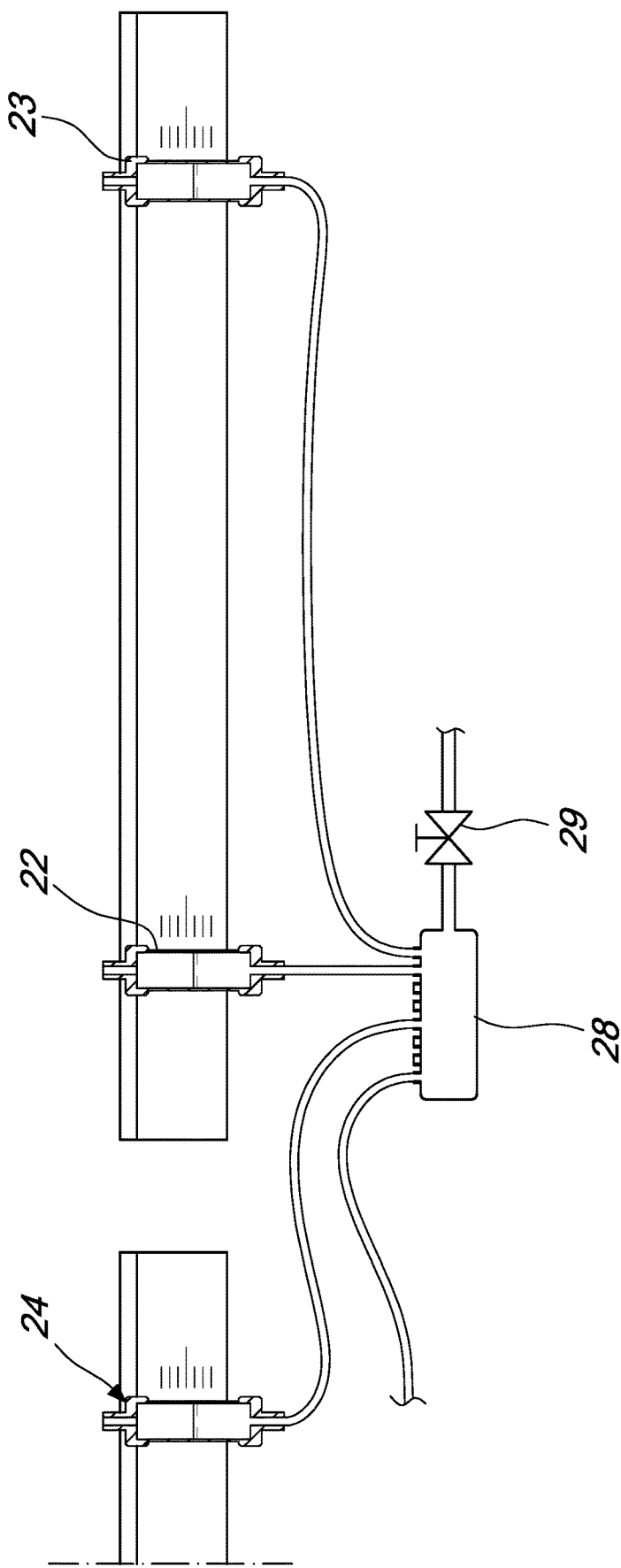
FIG. 2 is a schematic side view of a liquid-based leveling device of the device according to the invention, in a first embodiment.

The positioning device 1 comprises a first position verifying assembly, which will be described immediately hereinafter and is also shown in FIG. 2 in a basic form.

For this purpose, in fact, the positioning device 1 comprises a liquid-based leveling device 2.

The latter in turn comprises, in the basic form of FIGS. 1 and 2, three positioning bulbs 21, 22, 23 and a reference bulb 24.

All the bulbs 21, 22, 23, 24 are mutually in fluid communication, so as to constitute a system of communicating vessels; in this manner, the level of the free surface of the liquid contained in the liquid-based leveling device 2 is the same for all the bulbs 21, 22, 23, 24.

The positioning bulbs 21, 22, 23 can be coupled to the module to be installed 42 and the reference bulb 24 can be coupled to the reference module 41.

For this purpose, the positioning bulbs 21, 22, 23 can each be coupled independently to the module to be installed 42 and the reference bulb 24 can be coupled to the reference module 41 by means of adapted coupling elements (e.g., screws or bolts or others), not shown.

If the modules 41, 42 are provided with longitudinal members 45 provided with linear guides or optionally with sets of teeth (e.g., helical or with a ballscrew guide or a rack or the like) in order to allow the movement of a functional element of the machine (e.g., working head or worktable moving carriage or the like), the bulbs are preferably coupled directly to said guide-equipped longitudinal members 45.

Figure 8:
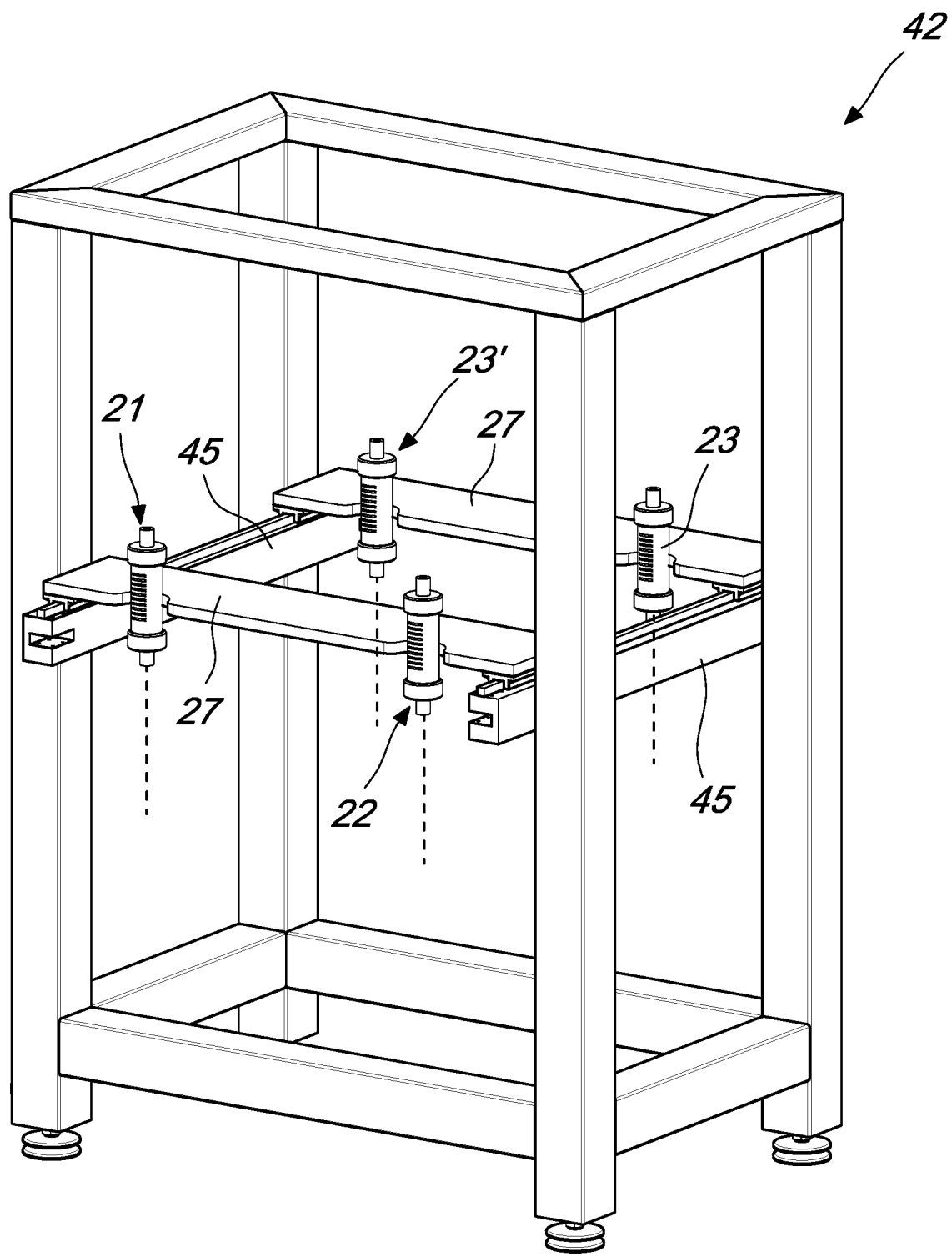
FIG. 8 is a perspective view of the invention with a third embodiment of the liquid-based leveling device.

According to a variation, shown in FIG. 8 for a non-limiting solution with four positioning bulbs for the module 42, the liquid-based leveling device 2 further comprises first and second moving carriages 27, which can be moved for example on the guides of the guide-equipped longitudinal members of the module 42, the positioning bulbs 21, 22, 23, 23' (the latter, if optionally provided) being coupled to said carriages, and a third carriage (not shown but similar to the first two), to which the reference bulb 24, which can be moved on the guides of the longitudinal members of the reference module 41, is coupled.

In this embodiment, the positioning and reference bulbs are not coupled directly to the guide-equipped longitudinal members of the modules but indirectly by means of the carriages 27.

The carriages 27 are functionally connected to the guides of the longitudinal members so that they can move along them; for this purpose, depending on the type of guides 45, the carriages 27 are preferably provided with coupling elements which cooperate with those of the guides; for example, if the guides 45 are of the type with a rack with helical teeth, then the carriages 27 are preferably provided with worm screws which mesh with the rack.

Figure 4:
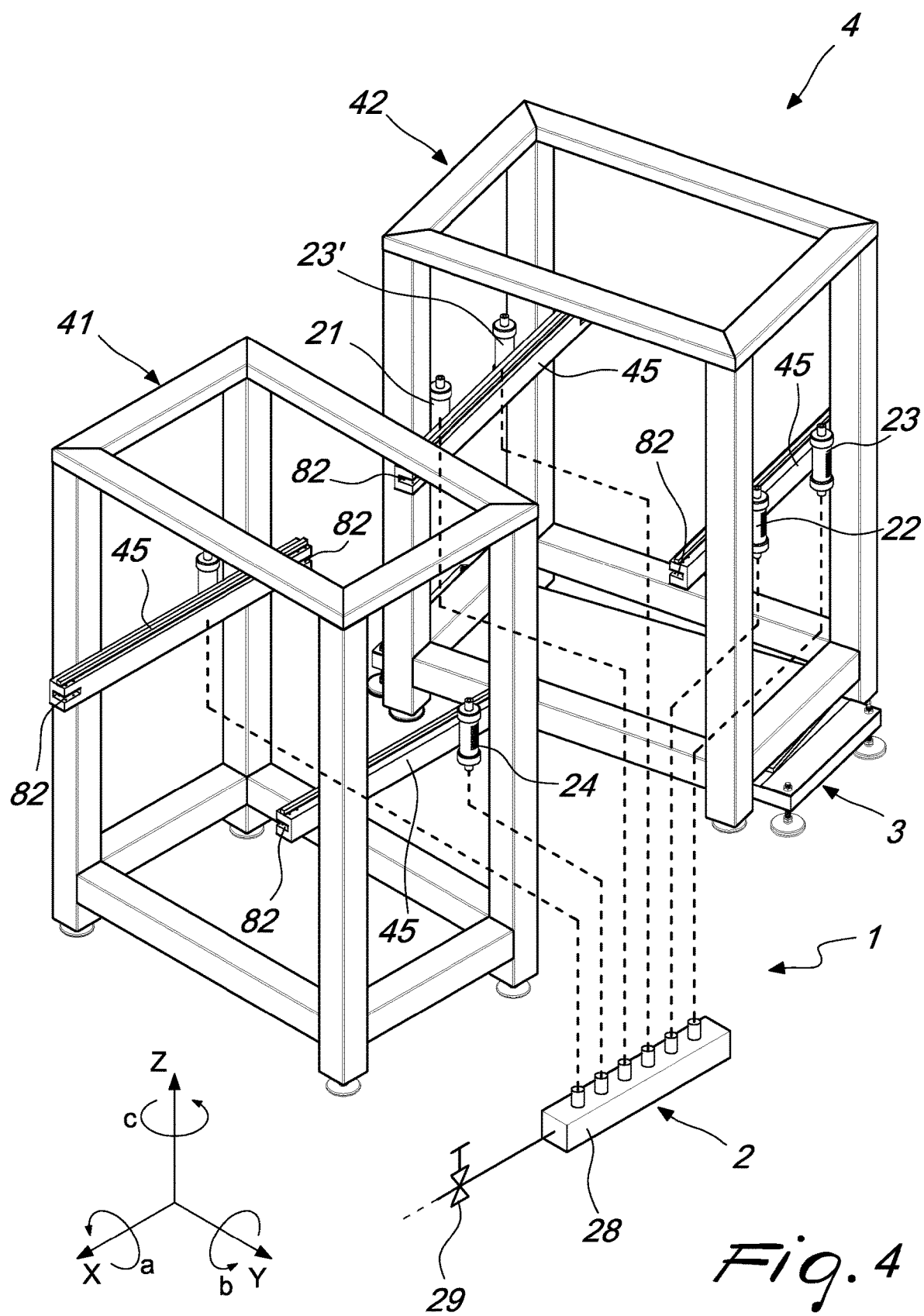
FIG. 4 is a perspective view of a modular bed during assembly, in which a new module is to be assembled to a reference module that is already mounted, with an assembly and orientation device according to the invention in a second embodiment.
Figure 5:
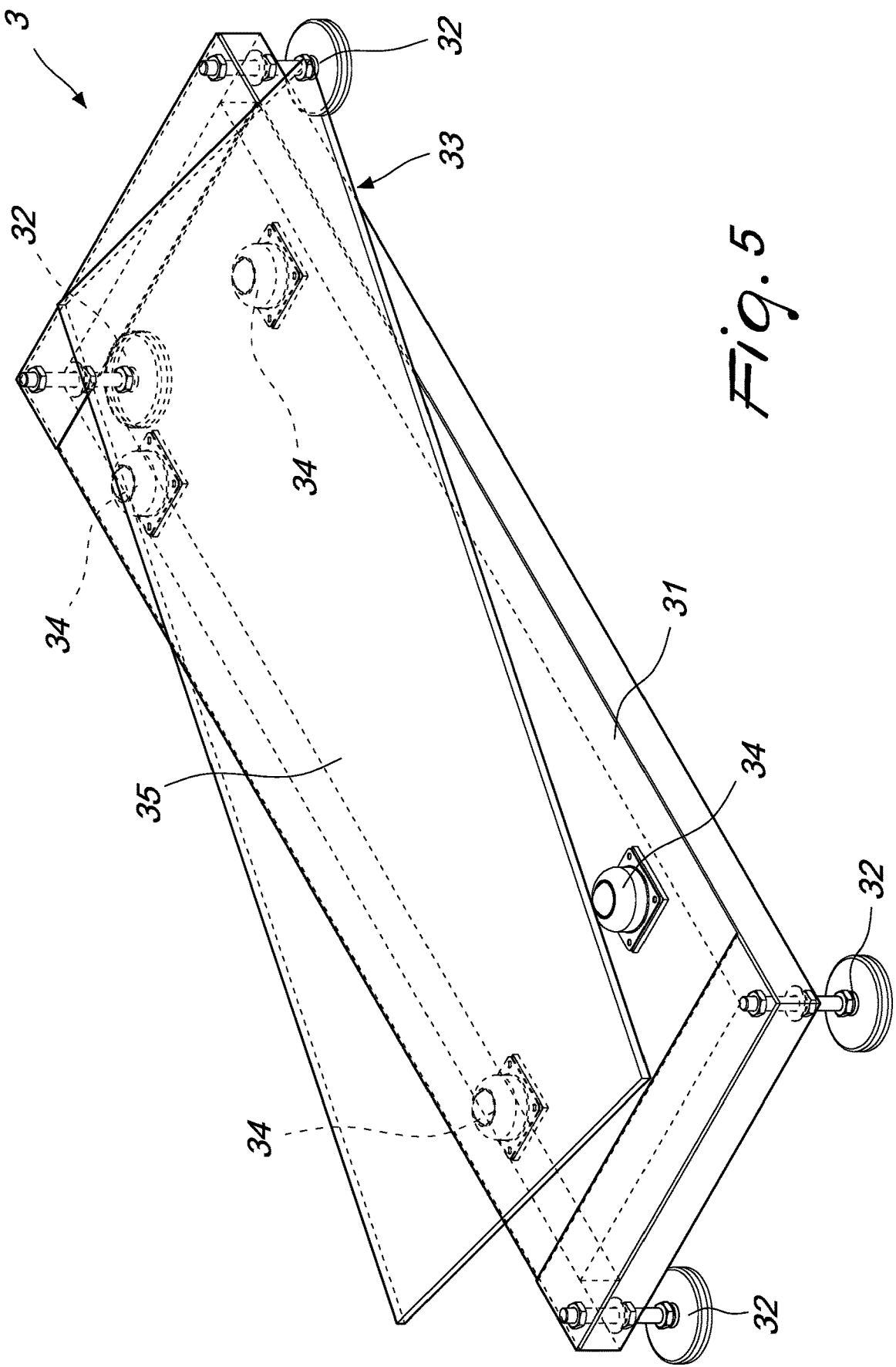
FIG. 5 is a perspective view of the base support of the device, in a second embodiment.
Figure 6:
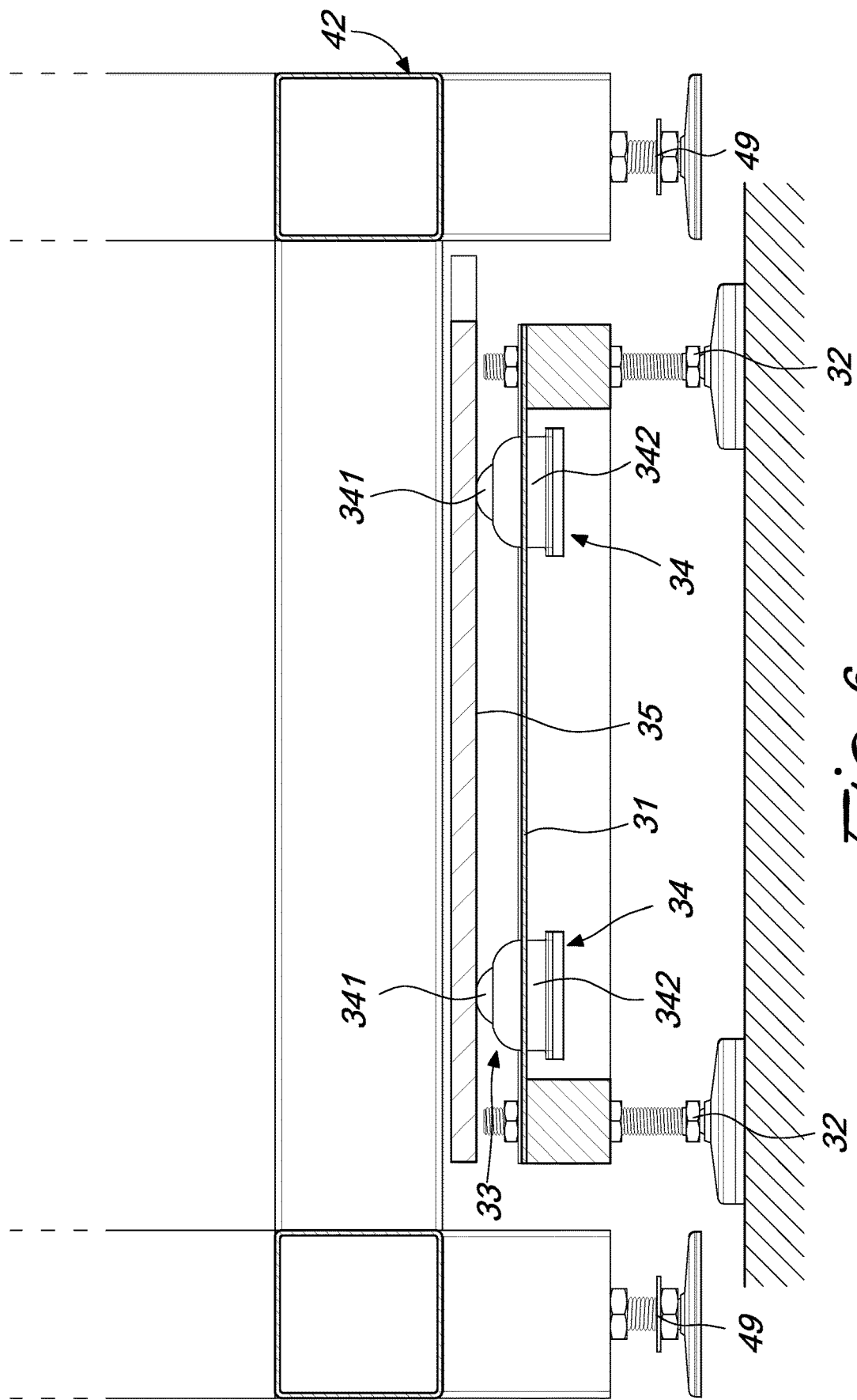
FIG. 6 is a cross-sectional view of the base support of the device according to the preceding figure and of part of a module of the bed.

According to an advanced embodiment of the liquid-based leveling device 2 shown in FIG. 4 (and also in the example of FIG. 8), there are four positioning bulbs 21, 22, 23 and 23' and/or two reference bulbs 24 and 24'.

According to yet another embodiment (not shown), there are more than four positioning bulbs and more than two reference bulbs.

The minimum number of positioning bulbs of the device according to the invention is three positioning bulbs: this consideration arises from the fact that, in space, one and only one plane passes through three points and therefore the correct positioning of the plane that passes through the free surface of the liquid contained in the bulbs 21, 22, 23 and the reference bulb 24 makes it possible to correctly position in space and with respect to the reference module 41, according to three degrees of freedom, the module to be installed 42 to which the three positioning bulbs 21, 22, 23 are connected.

In particular, designating as Z the vertical axis of a set of three Cartesian axes X, Y, Z and as a, b, c the rotation angles about each one of the axes (as shown in FIGS. 1 and 4), the use of the liquid-based leveling device 2 makes it possible to align the position of the module 42 with respect to the position of the reference module 41, already positioned with the guide-equipped longitudinal members arranged horizontally, by precisely moving and orienting the module 42 along the axis Z and according to the rotation angles a and b, thus eliminating three degrees of freedom in the spatial positioning of the module 42 with respect to the module 41.

In fact, by moving in space the module 42 with respect to the module 41 until the levels of the free surface of the positioning bulbs 21, 22, 23 and that of the reference bulb 24 become the same, the position of each module 41 and 42 becomes the same as regards the axis Z (elevation) and the angles a and b, which define the angular orientation of the plane that contains the longitudinal members of the module 42, and the horizontality condition of the plane is determined, the plane therefore being normal to the axis Z and therefore coplanar to the plane that contains the guide-equipped longitudinal members of the reference module 41.

Of course, theoretically more precise measurements are obtained by increasing the number of the positioning or reference bulbs, but essentially the degrees of freedom that one is able to eliminate in the manner described above are Z, a, b.

Preferably, the bulbs (both the positioning bulbs and the reference bulbs) are graduated, so as to allow the visual reading of the level of the free surface of the fluid and allow comparison.

In combination or as an alternative, the device 1 comprises a system for measuring the level of the liquid inside the bulbs; the system can be of the electrical/electronic type with optical sensors for measuring the level of the free surface; alternatively, the measurement system can be of the type adapted to verify the quantity of liquid contained in each bulb, for example by means of a measurement of the electrical parameters (e.g., resistance or capacitance) of the liquid contained in each bulb; in this last case, it is preferable for all the bulbs to have the same volume.

Preferably, the liquid contained in the bulbs is water or, as an alternative, an electrically conducting or dielectric liquid.

Preferably, the bulbs are connected by means of tubes to a common tank 28, toward which all the tubes of all the bulbs open, so as to generate the system of communicating vessels with the common tank.

Preferably, the common tank 28 is provided with a valve 29 in order to be filled and emptied with the measurement liquid which is introduced starting from a source of liquid; for example, if the liquid is ordinary water, the source could be an ordinary faucet connected to the water mains; this makes it possible to fill and empty in a very practical manner the hydraulic circuit with communicating vessels that comprises the bulbs, the tank and the tubes.

The remaining degrees of freedom X, Y, c are eliminated, in principle, by means of an alignment with different and per se known devices, for example optical sighting or measurement systems (e.g., laser, infrared, and the like) or the like.

According to a further embodiment, however, the remaining degrees of freedom are eliminated by means of a mechanical key system 8, which will be described hereinafter in the context of the description of the modular bed 4 but which is to be understood from thus point onward as being part of the positioning device according to the invention.

Figure 3:
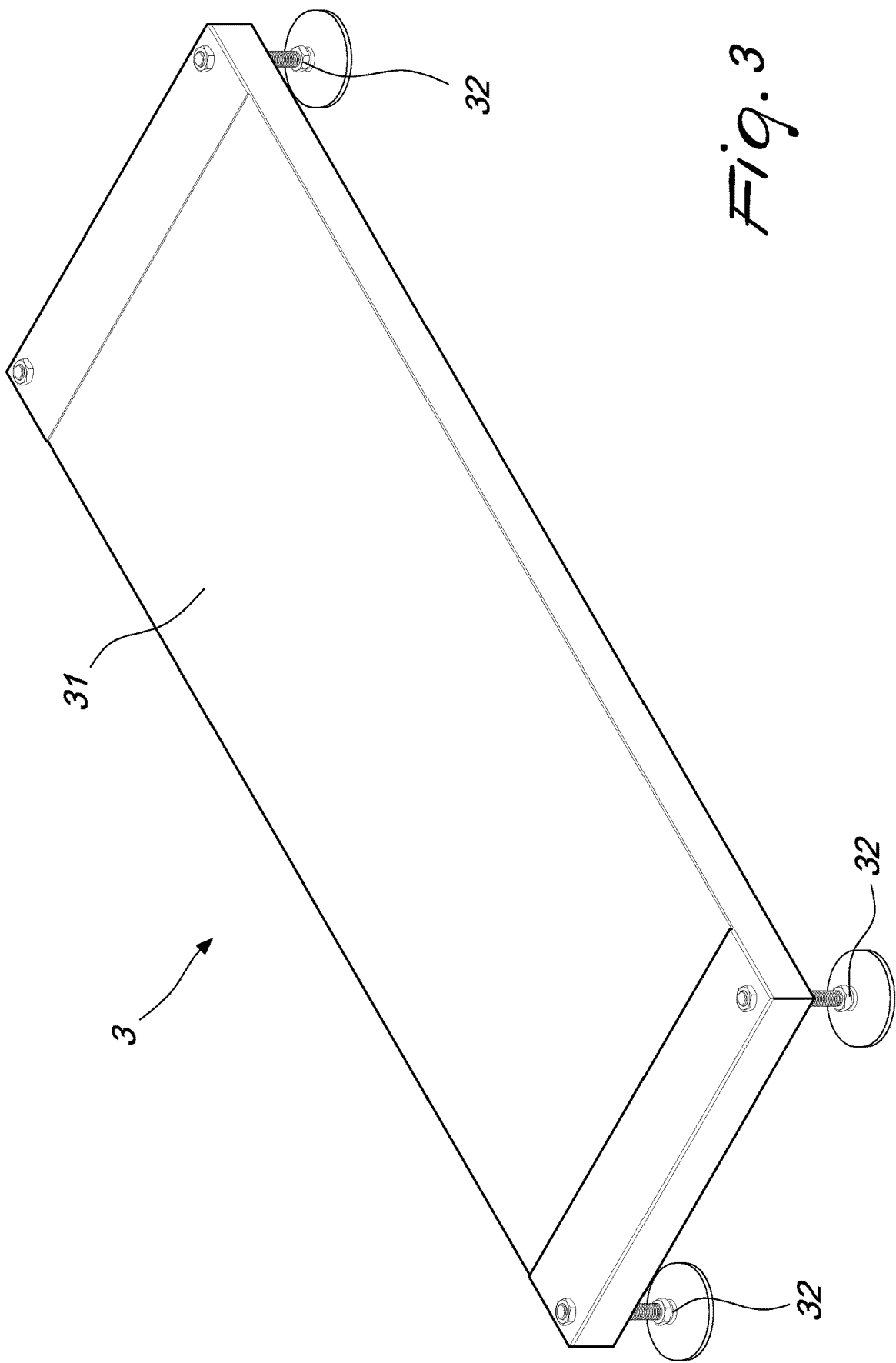
FIG. 3 is a perspective view of the base support of the device according to the invention in a first embodiment.

Moving on now to the second assembly of the positioning device 1, it is also shown in the detail view of FIG. 3 in a basic embodiment and is essentially a movement assembly.

For this purpose, the positioning device 1 comprises a base support 3 which comprises a first plate 31 and supporting feet 32 which are connected to the first plate 31.

The feet 32 are adjustable in extension with respect to the plate 31, so that when they rest on the floor they support the plate 31 at an elevation Z from the floor that is adjustable.

For this purpose, the feet 32 are individually extensible in length, for example by virtue of screw or hydraulic or pneumatic means or the like; feet of this kind are per se known and these details are not dwelt upon further.

Preferably, there are four feet 32, as in the embodiment shown in FIG. 3, and they are independently adjustable in extension; by varying the adjustment of the individual feet, the plate not only moves along the axis Z but rotates about the angles a and b.

The base support 3 is configured so as to support from below the module 42 of the bed 4 in a condition in which it is raised from the floor; in a basic embodiment, the module 42 that is being oriented is rested directly on the plate 31 of the base support 3 and is oriented according to the three degrees of freedom Z, a, b by virtue of the individual adjustment in extension of the feet 32.

In this manner, by using the liquid-based leveling device 2 and the base support 3 of the positioning device 1 in combination, it is possible to mount the module 42 aligned in Z, a, b with the module 41 on which the reference bulb 24 is positioned.

According to an optional characteristic, the base support 3 optionally comprises an interface element 33 which is functionally coupled to the first plate 31 and is designed to be interposed between it and the module to be installed 42.

The interface element 33 in its general features comprises at least three ball-type transfer units 34.

The ball-type transfer units are known in the field also by the term "ball transfer unit" and are to be understood as being per se known.

Briefly, each ball-type transfer unit 34 comprises a ball 341 and a rolling seat of the ball 342 which is then applied to an adapted support.

In the basic embodiment (not shown), the ball-type transfer units 34 comprise removable mounting elements in order to be coupled to the module of the bed 42 that is to be installed; once the module 42 has been installed and coupled to the adjacent module 41, the ball-type transfer units 34 can be removed and reused in order to mount another module.

In this embodiment, therefore, the rolling seats of the balls are provided in seat bodies 342 which are coupled (preferably detachably) to the module 42 that is to be installed; upon positioning, the balls 341 rest and rotate on the first plate 31, allowing the positioning of the module 42 according to the remaining degrees of freedom which have not been adjusted by means of the feet 32, i.e., the axes X and Y and the angle c (rotation about Z).

In this manner, what is obtained is that the base support 3 allows a spatial movement of the module to be installed 42 according to six degrees of freedom.

Once the module 42 has been positioned correctly with respect to the module 41, the supports 49 that are adjustable in extension of the module 42 itself (e.g., adjustable feet) are used in order to bring it to rest on the floor or foundation in the desired spatial position which corresponds to the position obtained by means of the use of the base support 3.

The latter can then be removed and used for the spatial positioning of another module.

In other, more advanced embodiments, such as the one shown in the accompanying figures, the interface element 33 comprises, in addition to the ball-type transfer units 34, also a second plate 35 with planar opposite main surfaces, with the ball-type transfer units 34 interposed between the first plate 31 and the second plate 35.

Preferably, the first plate 31 in this case is fixed to the ball-type transfer units 34 and the module is rested on the second plate 35, with the balls 341 resting thereon: the positioning according to the degrees of freedom X, Y, c is substantially similar to what has just been discussed.

The choice of the ball-type transfer units 34 instead of simple castors arises from the fact that with respect to castors the ball-type transfer units 34 do not have the nonholonomic constraints which would force, in the case of castors, multiple maneuvers in order to provide movement on the X-Y plane and the rotation c about the axis Z which are required for correct and precise positioning. Likewise, the choice of the ball-type transfer units 34 instead of simple sliding surfaces arises from the fact that the ball-type transfer units have lower friction, to the benefit of ease and precision of positioning.

The method according to the invention comprises the following steps:
- a—providing a liquid-based leveling device 2 which comprises three positioning bulbs 21, 22, 23 and a reference bulb 24 which are in mutual fluid communication, in order to constitute a system of communicating vessels;
- b—coupling the positioning bulbs 21, 22, 23 to a module to be installed 42 and the reference bulb 24 to a reference module 41;
- c—providing a base support 3 which comprises a first plate 31 and supporting feet 32 which are connected to the first plate 31 and are each independently adjustable in extension with respect to the first plate;
- d—suspending the module to be installed 42 on the base support 3,
- e—adjusting the supporting feet 32 until the free surface levels of the fluid of the positioning bulbs 21, 22, 23 and of the reference bulb 24 are mutually aligned,
- f—locking the module to be installed 42 in position.

In this manner, the alignment in spatial position of the module to be installed 42 with respect to the reference module 41 at least according to three degrees of freedom (Z, a, b) is obtained.

According to an advanced variation of the method, it further provides for the following steps:
- g—providing an interface element 33 which is functionally coupled to the first plate 31 and comprises at least three ball-type transfer units 34,
- h—interposing the interface element between the first plate 31 and the module to be installed 42, so as to allow an alignment of the modules 41, 42 according to three additional degrees of freedom (X, Y, c).

A further object of the invention is a modular bed 4 for machine tools, which comprises a first module 41 and a second bed module 42, which can be mutually coupled in order to provide the bed 4, wherein each module 41, comprises ground resting feet and two parallel guide-equipped longitudinal members 45 which preferably comprise linear guides (preferably ballscrew or racks or the like), which allow linear movement along the axis of the guides for the advancement of a carriage with a working head of the machine (which preferably comprises a spindle with a tool holder) and/or a worktable in which, in the condition in which the bed is assembled, the guide-equipped longitudinal members 45 of one module 41 are each aligned and coaxial with a respective guide-equipped longitudinal member 45 of the adjacent module 42, so as to be extended along the longitudinal extension of the modular bed.

In the assembly condition described herein, it is assumed that the installed module 41 has the parallel guide-equipped longitudinal members 45 extending horizontally (or substantially horizontally), i.e. lying on the same horizontal plane.

Figure 7:
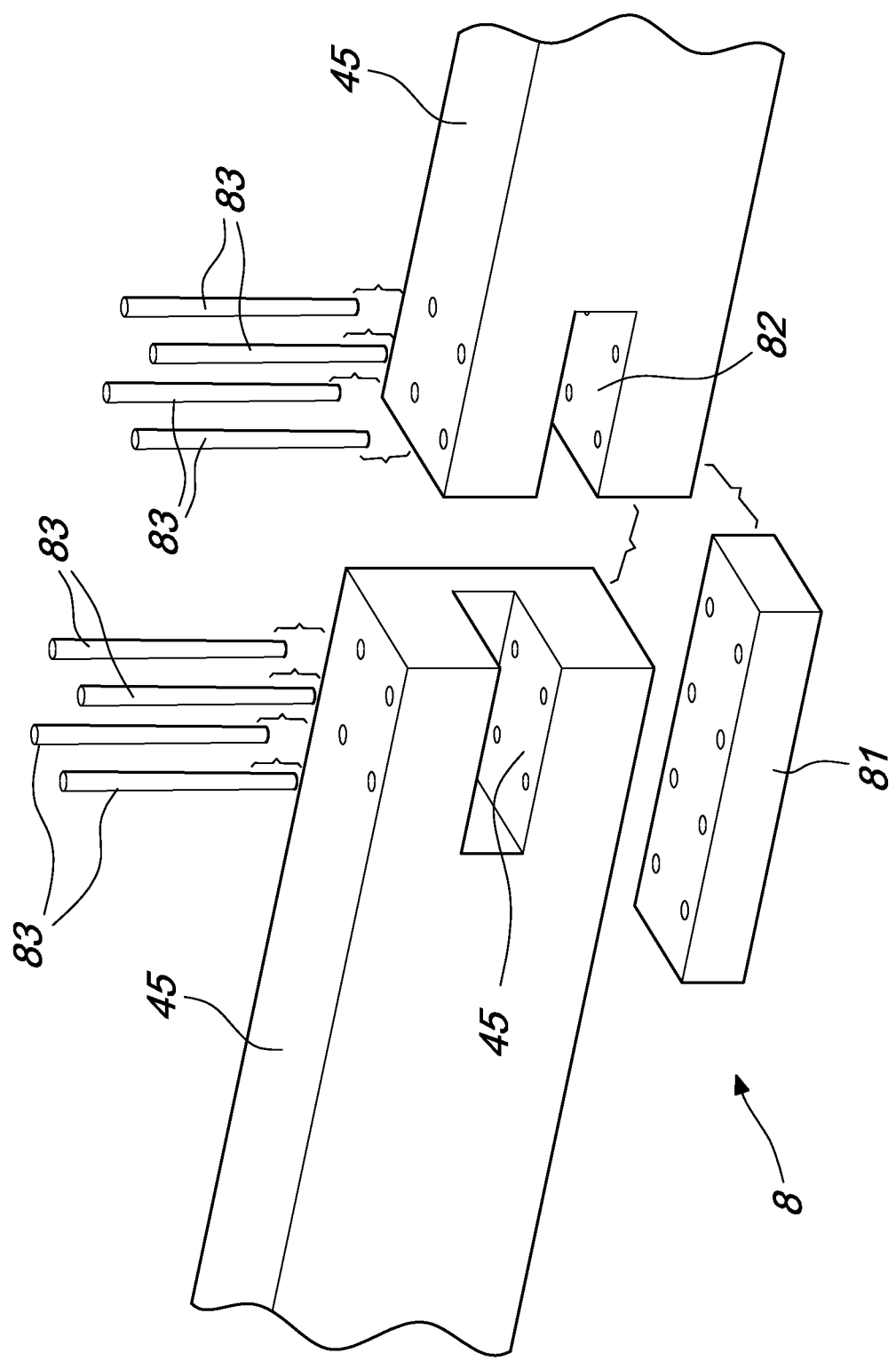
FIG. 7 is a detailed perspective view of the terminal parts of the guide-equipped longitudinal members belonging to two bed modules to be connected according to the invention.

With reference also to FIG. 7, the bed according to the invention comprises, for each terminal part of the guide-equipped longitudinal members 45 of adjacent modules, a key system 8 for coupling which is capable of ensuring the connection and retention of a correct coaxial alignment of the guide-equipped longitudinal members of the two adjacent modules.

The key system 8 according to the invention comprises, for each pair of guide-equipped longitudinal members 45 (one of a first module 41 and one of a second module 42) to be coupled, a key 81, a seat 82 provided in each guide-equipped longitudinal member, and centering pins 83.

The key 81 is prismatic, preferably provided as a parallelepiped with parallel flat faces.

Each seat 82 has a shape that is complementary to the shape of the key 81 and an extension that is approximately equal to half thereof, so that when the key is accommodated in the seats 82 of the two adjacent guide-equipped longitudinal members it is accommodated substantially half in a seat 82 of one guide-equipped longitudinal number 45 and half in the seat 82 of the other guide-equipped longitudinal member 45.

The fixing in position of the key 81 occurs by means of the pins 83, which are accommodated in first holes provided on the guide-equipped longitudinal members; the first holes extend essentially at right angles to the longitudinal extension of the guide-equipped longitudinal member: in the preferred case in which the guide-equipped longitudinal members have a horizontal longitudinal extension, the holes for the pins 83 are arranged vertically.

The same occurs for the key 81, which is provided with second holes which, in the condition in which the key is accommodated in the seats 82, are aligned with the first holes on the guide-equipped longitudinal member when the coaxial alignment condition of the guide-equipped longitudinal members is achieved.

The pins 83 are preferably conical; for each seat 82 there are at least two pins 83 and a corresponding number of first and second holes is provided on the guide-equipped longitudinal member and on the key 81: once the guide-equipped longitudinal members have been aligned, for example by virtue of the positioning device or the method according to the invention, the conical pins 83 are inserted in position and forced.

In this manner, the alignment over time of the guide-equipped longitudinal members, the coaxiality of the corresponding linear guides and the correct operation of the machine tool mounted on the modular bed thus provided are ensured.

Advantageously, the key system 8 that has just been described makes it possible to verify simultaneously also the correct alignment of the two modules 41, 42 according to the degrees of freedom X, Y, c; in this manner, by using the device 1 described above in the version with the base support 3 provided with a first plate 31 and a ball-type transfer unit 34, what is obtained is not only the verification of the alignment of the modules 41, 42, by means of the liquid-based leveling device 2 (for the degrees of freedom Z, a, b) and the key system (for the degrees of freedom X, Y, c), but also the possibility to adjust the position (in the six degrees of freedom X, Y, Z, a, b, c) by virtue of the base support 3 via adjustment of the feet 32 (for the position in Z, a, b) and the movement that can be obtained with the ball-type transfer units 34 (for the position in X, Y, c).

As is evident from what has just been described, the solution that has just been outlined makes it possible to align precisely and in space (according to the six degrees of freedom X, Y, Z, a, b, c) the modules of a modular bed for machine tools without having to use far more expensive and delicate systems, such as for example laser-guided systems or the like.

In an embodiment, the modular bed according to the present invention is provided with the positioning device described above, at least during a step of assembly of said modular bed.

In this embodiment, the modular bed therefore comprises the characteristics described above relating to the positioning device 1 (including the optional ones), which are not repeated here for the sake of brevity.

Of course, in addition to the module 42, it is also possible to install additional bed modules, which are oriented spatially by means of the device 1 described above (or the associated method).

In practice it has been found that the invention achieves the intended aim and objects, by providing a device and a method for positioning a modular bed for machine tools which allows a spatial positioning of the modules that is at once quick and precise.

The invention thus conceived is susceptible of numerous modifications and variations, all of which are within the scope of the appended claims; all the details may furthermore be replaced with other technically equivalent elements.

In practice, the materials used (so long as they are compatible with the specific use), as well as the contingent shapes and dimensions, may be any according to the requirements and the state of the art.

The disclosures in Italian Patent Application No. 102019000012486 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A device (1) for positioning a module of modular bed (4) for machine tools, wherein the modular bed (4) comprises a reference module (41), with two longitudinal members (45) equipped with guides, which are parallel and arranged on a horizontal plane, and a module to be installed (42) which is spatially aligned with the reference module (41), the positioning device (1) comprising:
a liquid-based leveling device (2) which comprises
at least three positioning bulbs (21, 22, 23)
at least one reference bulb (24), the three positioning bulbs (21, 22, 23) and the reference bulb (24) being mutually in fluid communication, so as to constitute a system of communicating vessels, the three positioning bulbs (21, 22, 23) being associable with the module to be installed (42) and the reference bulb (24) being associable with the reference module (41), so as to allow an alignment of the modules (41, 42) according to three degrees of freedom (Z,a,b);

a base support (3) which comprises
  a first plate (31) and
  supporting feet (32) which are connected to the first plate (31),
the feet (32) being each adjustable independently in extension with respect to the first plate (31)
so that the base support (3) allows a spatial movement of the module to be installed (42) at least along said three degrees of freedom (Z,a,b).

2. The positioning device (1) according to claim 1, characterized in that the base support (3) further comprises an interface element (33) which is functionally coupled to the first plate (31) and comprises at least three ball-type transfer units (34), the interface element being configured to be interposed between the first plate (31) and the module to be installed (42), so as to allow an alignment of the modules (41, 42) according to three additional degrees of freedom (X,Y,c).

3. The positioning device (1) according to claim 1, characterized in that the liquid-based leveling device (2) further comprises at least two carriages (27) on the module to be installed (42) to which said positioning bulbs (21, 22, 23) are coupled, and one carriage on the reference module (41) with at least one reference bulb (24).

4. The positioning device (1) according to claim 1, characterized in that said positioning bulbs (21, 22, 23, 23') and said reference bulbs (24, 24') are graduated.

5. The positioning device (1) according to claim 1, characterized in that it comprises a system for the measurement of the level of a liquid inside said positioning bulbs (21, 22, 23, 23') and said reference bulbs (24, 24').

6. The positioning device (1) according to claim 1, characterized in that it comprises a tank (28) which is in hydraulic communication with the positioning bulbs (21, 22, 23, 23') and the reference bulbs (24, 24'), said tank (28) being preferably provided with a valve in order to be filled and emptied with a measurement liquid.

7. The positioning device (1) according to claim 2, characterized in that the interface element (33) also comprises, in addition to the ball-type transfer units (34), a second plate which can slide on the ball-type transfer units (34) with the ball-type transfer units (34) interposed between the first and second plates.

\* \* \* \* \*